Feb. 24, 1942.                M. MOOTS                 2,274,340
                        SEED GATHERING APPARATUS
                         Filed May 6, 1941           2 Sheets-Sheet 1
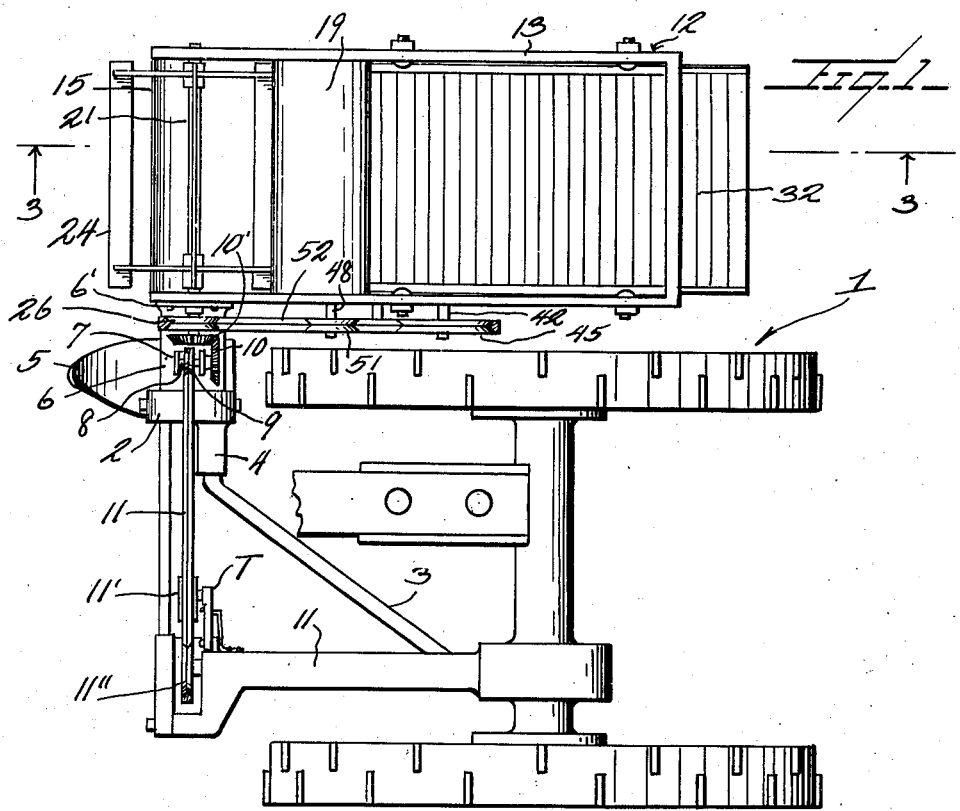
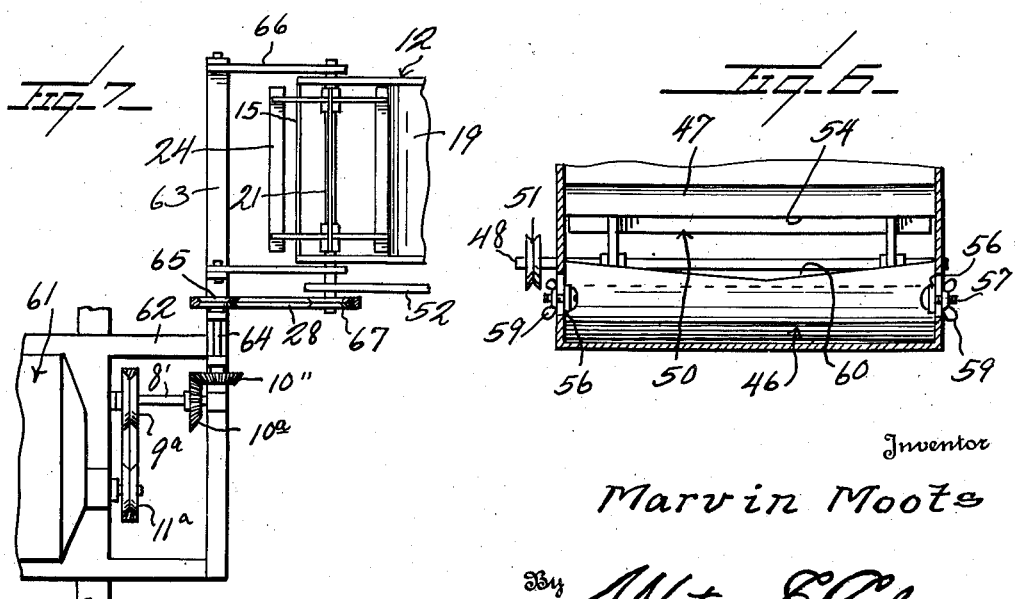
Inventor
Marvin Moots
By Watson E. Coleman

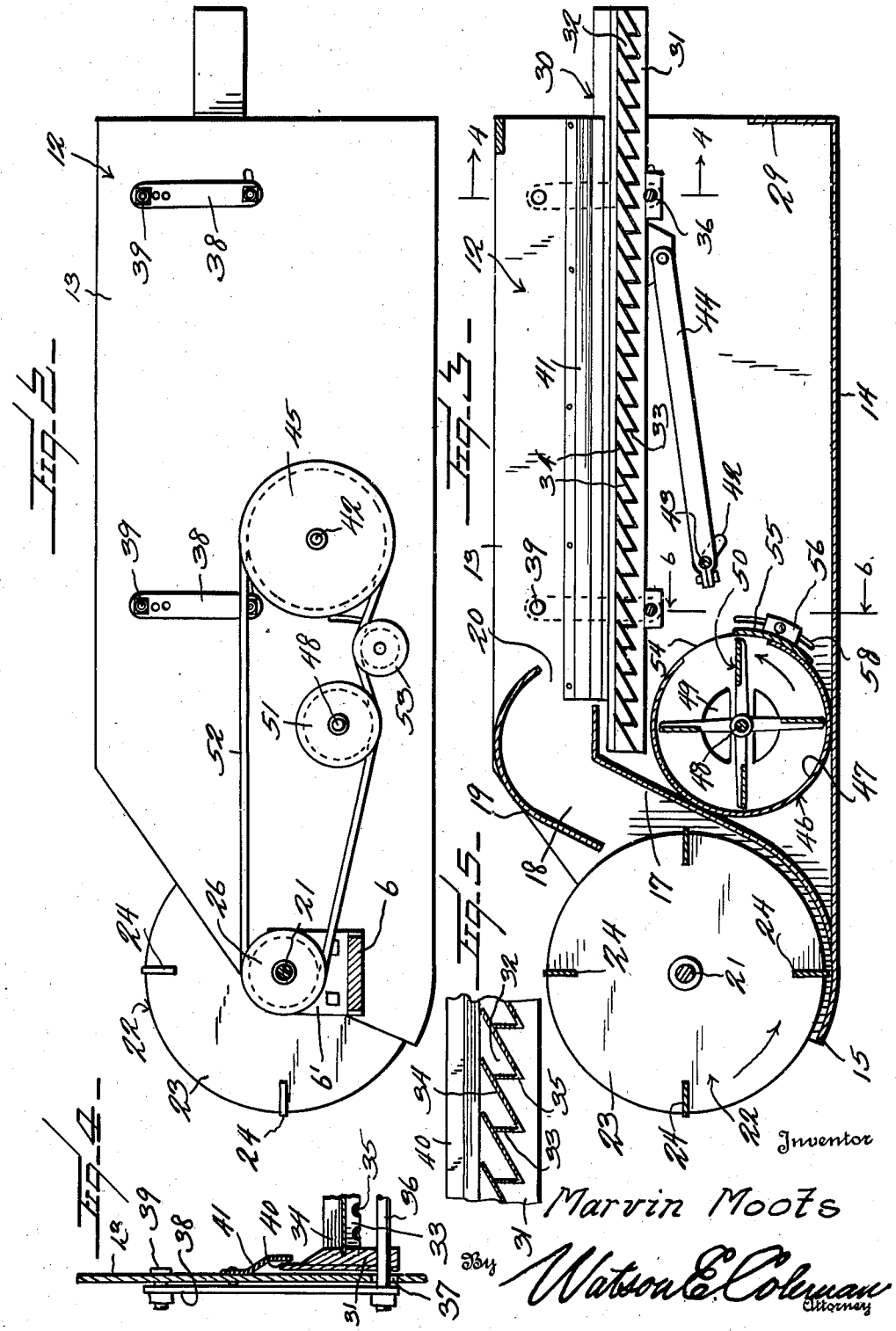

Patented Feb. 24, 1942

2,274,340

UNITED STATES PATENT OFFICE 2,274,340

SEED GATHERING APPARATUS

Marvin Moots, La Plata, Mo.

Application May 6, 1941, Serial No. 392,170

9 Claims. (Cl. 56—128)

This invention relates generally to improvements in harvesting machines and pertains particularly to a machine designed for harvesting grass seeds, more particularly the seeds of lespedeza plants.

The primary object of the present invention is to provide an apparatus which may be readily coupled with a mowing machine in place of the usual mower bar or with a tractor and drawn over the ground to remove seed from the seed bearing tops of low lying plants such as lespedeza, clover or the like, and separate such seed from the husks, chaff or heads of the grass quickly and efficiently whereby the seed may be obtained in clean condition ready for use.

Another object of the invention is to provide in a seed harvesting machine of the character stated, a novel mechanism for wiping the seed from the tops of the plants and discharging the seed and any tops which may be removed directly onto a separator frame which is subjected to agitation and to an air blast to effect the clean separation of the seed from other particles of matter, the agitator being foraminous so that the seed may pass through to an underlying receptacle and air from an air blast device may pass upwardly therethrough to remove light particles such as husks, stems, etc.

Another object of the invention is to provide in a machine of the character stated, a novel type of separator screen in which a novel means is made use of for insuring the passage of seeds through the screen into a receptacle by preventing stems or other particles from entering and blocking the screen apertures.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 is a view in top plan of an apparatus constructed in accordance with the present invention, the same being shown coupled with a mowing machine in the position normally occupied by the cutter bar.

Fig. 2 is a view in elevation of the inner side of the apparatus showing the driving connections between the several rotary parts.

Fig. 3 is a longitudinal section taken on the line 3—3 of Fig. 1.

Fig. 4 is a detailed sectional view taken on the line 4—4 of Fig. 3.

Fig. 5 is an enlarged fragmentary section taken longitudinally of the separator screen.

Fig. 6 is a partial vertical section taken substantially on the line 6—6 of Fig. 3.

Fig. 7 is a plan view illustrating a manner of coupling the apparatus with a tractor.

Referring now more particularly to the drawings, the present device is shown in Fig. 1 coupled with a mowing machine from which the usual cutter bar has been removed. This machine is indicated generally by the numeral 1 and the numeral 2 designates the unit to which the push bar 3 is coupled through the medium of the push bar bearing 4 and to which the usual mower inner shoe 5 is pivotally attached in the well-known manner.

For effecting the coupling of the device with the mowing machine structure there is provided a bracket plate 6 which is bolted to the inner shoe 5 in substitution for the inner end of the usual cutter bar, and this bracket plate supports on a pair of bearings 7, a stub shaft 8 which carries a pulley 9 and a miter gear 10. The shaft 8 extends lengthwise of the machine as shown, and the pulley 9 supported thereon is coupled with the usual pitman drive shaft 11 of the mowing machine by means of a belt 11' and a pulley 11" which is mounted upon the end of the power shaft 11.

A belt take-up mechanism T is provided for tightening the belt 11' when the same slackens at periods during the operation of the machine.

The bracket 6 is provided at the end remote from the points of connection with the inner shoe with a vertical flange 6' for attachment to the seed collecting harvesting apparatus which is about to be described.

The seed harvesting apparatus constituting the present invention comprises a housing 12 having vertical side walls 13 and a bottom wall 14. This housing is relatively long and at its forward end there is provided a concave 15 which has an upwardly and rearwardly extending back wall 17 which forms one wall of a seed throat 18, the other wall being indicated by the numeral 19 and having a portion paralleling the wall 18 and curving upwardly and rearwardly, as shown in Fig. 3, to provide the downwardly directed rear discharge opening 20.

Extending transversely of the housing 12 concentrically with the concave 15 is a shaft 21 which at one end extends through a wall 13 of the housing and supports a miter gear 10' which meshes with the gear 10, as illustrated. The flange 6' of the bracket 6 is secured to this wall 13 through which the shaft 21 passes and the shaft passes through the flange so that the flange provides a suitable bearing therefor and the miter gear upon the end of the shaft 21 is in the proper position for engagement with the gear 10 which is supported by the bracket 6. By this arrangement power is transmitted from the belt 11' to the shaft 21.

Upon the shaft 21 there is mounted a cylinder indicated generally by the numeral 22 and comprising two or more disks 23 through the centers of which the shaft 21 passes and rub bars or blades 24 which parallel the shaft 21 and extend through the disks 23 at the peripheries of the same. These bars are in the form of flat strips of material, each of which has a portion extending beyond the peripheries of the supporting disk and the edges of these bars or blades move in close proximity to the inner surface of the concave throughout the extent of the curved portion thereof, as is clearly shown in Fig. 3. The cylinder 22 rotates in the direction indicated by the arrow in Fig. 3, so that it will be seen that as the housing moves over the ground with the forward edge of the concave close to the surface of the ground, the tops of low growing plant stalks will be wiped into the concave by the blades 24 and the seeds removed therefrom by the blades. The air movement produced by the blades 24 will serve to elevate the seeds through the throat 18 for discharge rearwardly in the housing.

Upon the side of the apparatus nearest the mowing machine the shaft 21 carries a pulley 26 through the medium of which power is transmitted in the manner hereinafter described to other parts of the apparatus. The cylinder 22 not only functions to remove the seed carrying tops of the plants and move them rearwardly toward the throat 18 but it is designed in a novel manner to produce an air current which is of equal intensity throughout the length of the cylinder instead of being strong at the center of the cylinder and weak at the ends thereof.

It has been determined by me that a blower fan operating in a housing and obtaining its air supply at the ends of the housing, delivers a greater volume of air near its ends than toward its center. However, a stripping cylinder of the usual construction which operates largely in the open, rather than within a housing like a blower fan, delivers its air blast near the transverse center. By providing the present cylinder 22 with the solid disks which extend almost to the outer edges of the rub bars, the concentration of air at the middle of the throat 18 is prevented and consequently a current of air is delivered through the throat 18 by the cylinder which is of substantially the same intensity throughout the length of the cylinder.

The wall 17 forming the upward and rearward extension of the concave also forms a forward wall for a seed receptacle R, the rear wall for the receptacle being indicated by the numeral 29 and extending transversely of the housing between the side walls 13, the lower edge of this back wall being joined to the bottom wall 14 of the housing, as shown in Fig. 3.

Extending longitudinally within the housing over the seed receptacle R is a combination straw rack and sieve 30. This structure comprises the spaced parallel side beams 31 between which is supported a corrugated plate 32, the corrugations of which extend transversely of the plate and comprise the vertical wall portions 33 and the upwardly and rearwardly extending wall portions 34 which extend from the lower edges of the vertical wall portions across the tops of the vertical wall portions of the following corrugations. Each corrugation, therefore, has an inclined wall which projects beyond and over the channel of a following corrugation and each of the corrugations has a series of apertures 35 formed in the corner between its vertical wall and its rearwardly inclined wall, these apertures being partly in the vertical wall and partly in the inclined wall, as is shown in Figs. 4 and 5. This arrangement aids to a considerable extent in preventing straw from hanging in the holes and thus the sieve will not become easily clogged but the straw and other light matter such as chaff will be carried rearwardly over the inclined portions of the corrugations and the seed will pass through into the receptacle R.

The sieve is supported upon cross bars 36 which extend beneath the beams 31 and are pivotally joined thereto and these bars extend at their ends through slots 37, Fig. 4, in the side walls 13 and are attached at their ends to suspension arms 38 which are located upon the outer sides of the housing walls 13 and are pivotally attached to the walls by pivot bolts 39 or in any other suitable manner. These suspension arms 38 may be adjusted longitudinally on the pivot bolts 39 so that the sieve can be raised or lowered, as may be desired, either at one end or both ends.

In order to prevent the seed or straw or other material from escaping beyond the sides of the sieve, the latter has the beams 31 extended as illustrated in Fig. 4, above the corrugated plate and the beams are provided with longitudinally extending upstanding flanges 40 which are movably engaged beneath the guard flaps 41 which are secured to and lengthwise of the adjacent wall 13, as is shown in Fig. 4. These guard flaps may be of any suitable flexible material such as leather, belting or the like, and as will be readily seen, they function to prevent seeds or other material escaping over the sides of the sieve between the latter and the adjacent wall 13.

Extending transversely of the housing beneath the sieve 30 is a crank shaft 42 having a crank 43 with which is connected one end of a pitman 44, the other end of the pitman being pivotally attached to the under side of the sieve, as shown. One end of the crank shaft 42 carries a pulley wheel 45 which is in the plane of the pulley 26 so that power may be transmitted from the pulley 26 to the pulley 45 in the manner hereinafter fully described to effect the shaking or oscillation of the sieve.

In order to facilitate the separation of the seed from straw and chaff, a blowing unit is provided which is located in the forward part of the housing behind the concave, such unit being indicated generally by the numeral 46 and shown in cross-section in Fig. 3. This blower unit comprises a cylindrical housing 47 through the axial center of which extends a shaft 48. The ends of the housing 47 are closed by the side walls 13 and both of these side walls are provided with air inlet openings 49 by means of which air can be drawn into the cylindrical housing 47. Supported upon the shaft 48 is a fan unit 50 and this is rotated through the medium of a pulley 51 carried upon the shaft 48 outside of the housing 12 and in the plane of the pulleys 26 and 45. A belt 52 connects these three pulleys 26, 45 and 51, as shown in Fig. 2, and a suitable tightening or tensioning pulley 53 may be employed to maintain the belt sufficiently tight to drive the two rotary structures 22 and 50 at a desired speed and to impart a desired speed of reciprocation to the sieve.

The fan housing 47 has an air outlet opening extending throughout its length and directed upwardly and rearwardly, as indicated at 54. The fan 50 delivers air toward the under side of the sieve as shown in Fig. 3, and in order that dust and chaff may not be blown through that portion of the sieve directly below the throat discharge opening 20, certain of the corrugations which are disposed directly beneath this opening are left unperforated. The air from the blower thus in considerable part passes rearwardly beneath the sieve and a great deal of the cleaning action of the blower is due to the current of air flowing beneath the separator frame or sieve backward and out at the rear of the machine, carrying with it light chaffy particles which pass through the screen. The reciprocatory or oscillatory movement of the sieve will then work the seeds from these unperforated corrugations back to those corrugations which are perforated so that the seed can pass through into the receptacle.

In order that the volume of air passing from the fan housing may be more readily controlled, there is provided a sliding door or gate 55 which extends lengthwise of the fan housing and may be shifted circumferentially thereon to cover or uncover the opening 54, as may be desired. Any suitable supporting means for this gate may be made use of, but there is here shown an ear 56 upon each end of the gate through which a bolt 57 passes outwardly through an arcuate slot 58 formed in the adjacent wall 13 of the main housing 12, and each of the bolts has a thumb nut 59 upon its outer end which, when tightened up on the bolt, secures the adjacent ear 56 to the wall of the main housing. The top edge of the gate 55 is cut down at the transverse center of the gate, as illustrated in Fig. 6, and indicated by the numeral 60. By this arrangement a larger volume of air can be directed to the center of the sieve than at the sides.

In Fig. 7 the rear end portion of a tractor is conventionally shown and indicated generally by the numeral 61. The coupling of the harvesting apparatus with the tractor is made by providing a bar 63 which is attached at one end to the usual rearwardly extending hitch frame 62 of the tractor and there is mounted upon this bar at the end nearest the hitch frame, a shaft 64 upon which is mounted a miter gear 10" and a pulley 65. The shaft 21 of the harvesting apparatus has connected with each end a link 66 which extends forwardly and is pivotally coupled with the bar 63 in the manner shown. Upon this shaft there is mounted a second pulley 67 and this is connected with the pulley 65 by a belt 28. An auxiliary power take-off shaft 8' is mounted upon the rear of the tractor draft frame which supports a miter gear 10ᵃ corresponding with the gear 10 and a pulley 9ᵃ corresponding with the pulley 9 which is coupled with the power take-off pulley 11ᵃ of the tractor by means of a belt 11ᵇ. It will be readily seen that connection may be easily established between the present seed collecting apparatus and suitable types of draft machines such as the mower structure or tractor structure referred to.

The present seed gathering apparatus is of relatively simple construction but is efficient in operation since by reason of the novel manner of coupling the rub bars or blades 24 with the disks 23, a fan-like action is had from this unit which not only turns the heads of the plants over into the concave so that the seeds will be knocked therefrom but forces the seeds and heads of the plants upwardly through the throat 18 for downward and rearward discharge onto the straw rack and sieve. Here, by reason of the jogging or reciprocating action of the sieve, the seeds are shaken loose to fall through into the receptacle R and the air flowing through the apertures of the sieve works the straw and chaff toward the rear for discharge into the field. If the seeds also work back instead of all passing through the apertures of the sieve, this may be controlled by raising the rear end of the sieve until the desired results are obtained.

What is claimed is:

1. A seed harvesting machine, comprising an elongated housing having a horizontal bottom wall adapted to be moved along the ground in close proximity thereto and side walls, the housing being open at its forward end, a concave in the lower forward part of the housing, the forward edge of the bottom wall of the housing forming an edge of the concave across which seed plants are gathered, a rotary member disposed in the concave for engaging the tops of seed plants to carry the same into the concave, a sieve supported within the housing for longitudinal reciprocatory movement, means for conducting seed from said concave upwardly and rearwardly onto the top of the sieve, means for rotating said rotary member and for imparting reciprocatory motion to the sieve, and means forming a seed collecting receptacle in the lower part of the housing beneath the sieve and behind the concave.

2. A seed harvesting machine, comprising a housing having a horizontal bottom wall adapted to be moved along the ground in close proximity thereto and side walls, the housing being open at its forward end, a concave in the lower forward part of the housing, the forward edge of the bottom wall of the housing forming an edge of the concave across which seed plants are gathered, a rotary member disposed in the concave for engaging the tops of seed plants to carry the same into the concave, said rotary member being constructed and arranged to also function as a blower, a sieve supported within the housing for longitudinal reciprocatory movement, means for guiding seed blown from said concave upwardly and rearwardly onto the top of the sieve, means for rotating said rotary member and for imparting reciprocatory motion to the sieve, means forming a seed collecting receptacle in the lower part of the housing beneath the sieve and behind the concave, and means for creating an air blast beneath the sieve and for directing the same upwardly and rearwardly through the sieve.

3. A seed gathering apparatus of the character stated, comprising an elongated housing having a bottom wall designed to be moved over the surface of the ground in close proximity thereto and having vertical side walls, the forward end of the housing being open, an upwardly directed concave wall in the forward part of the housing extending from the forward edge of the bottom wall upwardly and rearwardly and merging into a straight wall in the upper part of the housing inwardly of the open forward end, a rotating rubber unit extending transversely of the housing over said concave wall, comprising a shaft, circular plate members supported in spaced relation upon the shaft, and blade bars extending longitudinally of the shaft and through the peripheries of said circular members, said blades being arranged to move over the concave surface of said concave body, means forming an upwardly and rearwardly directed throat through which seed is driven by said blades, a sieve unit extending longitudinally within the housing and having one end arranged to receive seed from said throat, means suspending the sieve unit for longitudinal reciprocation, means comprising a part of the housing forming a seed receptacle beneath the sieve, and said sieve comprising a series of transversely extending channels each having a vertical forward wall and rearwardly and upwardly inclined rear wall extending over an adjacent vertical wall and channel, said channels having seed escape apertures in the bottoms thereof.

4. In a seed gathering apparatus of the character stated, means forming a seed receiving receptacle, a seed separating sieve located over said receptacle, means for picking up seed plants and conveying the same onto the top of said sieve, means for shaking the sieve, said sieve comprising a plate extending lengthwise of the apparatus and formed of a plurality of channel forming portions, each of said portions having a straight vertical wall and an upwardly and rearwardly inclined wall integral with the lower part of the straight wall, the two walls of each channel being apertured at the adjoining portions thereof and said upwardly and rearwardly inclined walls of the channels being extended over the vertical walls of adjacent channels.

5. In a plant seed gathering apparatus, an elongated housing open at its forward end, means in said forward end for gathering seed into the housing, an elongated sieve structure disposed horizontally in the housing, means for conveying the seed from said gathering means onto the top of the sieve structure, means at the forward and rear ends of said sieve structure supporting the same for reciprocatory movement in the housing, means for effecting such reciprocatory movement, and means for preventing the passage of seed between the sides of the sieve structure and the adjacent walls of the housing, comprising an upstanding flange extending lengthwise of each side of the sieve in spaced parallel relation with the wall, and a guard secured lengthwise of each wall above each flange and extending downwardly over the flange.

6. A seed gathering apparatus of the character stated, comprising an elongated housing having an open forward end, a concave forming a part of the forward end of the housing, a reel rotatably supported in said concave for drawing seed plants thereinto, an elongated sieve unit extending lengthwise of the housing and supported therein for longitudinal rectilinear movement, means for carrying seed from said concave onto the sieve, means for effecting reciprocatory movement of the sieve, and an air blast producing unit within the housing behind said concave and beneath said sieve and comprising a cylindrical housing extending transversely of the first housing, a blower unit within the cylindrical housing, means for admitting air into the cylindrical housing at an end thereof, means for discharging air from the cylindrical housing upwardly and rearwardly toward the under side of the sieve, comprising an opening extending lengthwise of the wall of the cylindrical housing, and means for regulating the discharge of air from said opening, comprising a gate member extending lengthwise of the wall of the cylindrical housing and adapted to be shifted circumferentially thereof to cover said opening.

7. A seed gathering apparatus of the character stated, comprising an elongated housing having an open forward end, a concave forming a part of the forward end of the housing, a reel rotatably supported in said concave for drawing seed plants thereinto, an elongated sieve unit extending lengthwise of the housing and supported therein for longitudinal reciprocatory movement, means for carrying seed from said concave onto the sieve, means for effecting reciprocatory movement of the sieve and an air blast producing unit within the housing behind said concave and beneath said sieve and comprising a cylindrical housing extending transversely of the first housing, a blower unit within the cylindrical housing, means for admitting air into the cylindrical housing at an end thereof, means for discharging air from the cylindrical housing upwardly and rearwardly toward the under side of the sieve, comprising an opening extending lengthwise of the wall of the cylindrical housing and means for regulating the discharge of air from said opening, comprising a gate member extending lengthwise of the wall of the cylindrical housing and adapted to be shifted circumferentially thereof to cover said opening, said gate member having the edge thereof nearest said opening longitudinally of the concave for cooperation with an adjacent edge of the opening to provide for a maximum discharge of air at all times adjacent the transverse center of the opening.

8. In a harvesting machine of the character stated, an elongated housing having an open front end, means forming a concave at said open end, said concave having a forwardly directed lower edge portion across which harvested material may be drawn, means extending upwardly and rearwardly from the concave through which harvested material is moved, and a harvesting reel rotatably supported in said concave and including a shaft, disk members supported upon said shaft and blades extending longitudinally of the shaft and passing through the peripheries of said disks to be supported by the disks, said blades having the peripheries of the disks extending substantially entirely thereacross whereby said peripheries come into close proximity to the wall of the concave, the blades being in closer proximity to said wall than the periphery of the disks, said disks functioning to prevent the concentration of air at the middle of the concave whereby the blades will maintain the movement across the concave toward the said material receiving means of a current of air of substantially the same pressure throughout the length of the concave.

9. The combination with a mowing machine having a sickle bar driving means and a pivoted inner shoe to which the sickle bar is coupled, of a bracket member secured to said inner shoe in replacement of said sickle bar, a seed harvesting apparatus having side walls and a forwardly opening concave between said walls at one end of the apparatus, a harvesting reel rotatably supported in the concave and having a shaft extending through one of said side walls, said bracket being secured to the said one of the side walls, a power transmitting mechanism supported by the bracket and operatively coupled with said shaft, and means operatively coupling said power transmitting mechanism with said sickle bar driving means.

MARVIN MOOTS.